(12) United States Patent
Yoshino

(10) Patent No.: US 10,969,368 B2
(45) Date of Patent: Apr. 6, 2021

(54) LIQUID CHROMATOGRAPH

(71) Applicant: Shimadzu Corporation, Kyoto (JP)

(72) Inventor: Saki Yoshino, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 169 days.

(21) Appl. No.: 16/328,302

(22) PCT Filed: Jun. 30, 2017

(86) PCT No.: PCT/JP2017/024089
§ 371 (c)(1),
(2) Date: Feb. 26, 2019

(87) PCT Pub. No.: WO2018/051610
PCT Pub. Date: Mar. 22, 2018

(65) Prior Publication Data
US 2019/0212310 A1 Jul. 11, 2019

(30) Foreign Application Priority Data
Sep. 16, 2016 (JP) .............................. JP2016-181326

(51) Int. Cl.
*G01N 30/34* (2006.01)
*G01N 30/84* (2006.01)
(Continued)

(52) U.S. Cl.
CPC ............. *G01N 30/34* (2013.01); *G01N 30/32* (2013.01); *G01N 30/46* (2013.01); *G01N 30/84* (2013.01);
(Continued)

(58) Field of Classification Search
CPC ........ G01N 30/32; G01N 30/34; G01N 30/46; G01N 30/463; G01N 30/84;
(Continued)

(56) References Cited

U.S. PATENT DOCUMENTS 6,404,193 B1 * 6/2002 Dourdeville ........... G01R 33/30
324/306
6,955,760 B2 * 10/2005 Iwata ................... G01N 30/462
210/101

(Continued)

FOREIGN PATENT DOCUMENTS

| JP | 2004-205358 A | 7/2004 |
| WO | 2009/044427 A1 | 4/2009 |
| WO | 2014/112527 A1 | 7/2014 |

OTHER PUBLICATIONS

Office Action from the JPO, dated Jan. 7, 2020, for counterpart Japanese Patent Application No. 2018-539532, submitted with a machine translation.

(Continued)

*Primary Examiner* — Justin N Olamit
(74) *Attorney, Agent, or Firm* — Muir Patent Law, PLLC

(57) ABSTRACT

The liquid chromatograph is provided with: a first dimension analysis unit; a diluent determination unit configured to determine the composition and flow rate of a diluent for diluting an eluent flowing out of the first dimension analysis unit based on the composition of the eluent flowing from the first dimension analysis unit; and a diluent liquid delivery unit configured to deliver the diluent of the composition determined by the diluent determination unit at the flow rate determined by the diluent determination unit so as to be delivered to the trap column while diluting the eluent flowing from the first dimension analysis unit.

18 Claims, 12 Drawing Sheets

(51) Int. Cl.
 *G01N 30/46* (2006.01)
 *G01N 30/32* (2006.01)
 *G01N 30/02* (2006.01)

(52) U.S. Cl.
 CPC ..... *G01N 30/463* (2013.01); *G01N 2030/027* (2013.01); *G01N 2030/324* (2013.01)

(58) Field of Classification Search
 CPC ..... G01N 2030/324; G01N 2030/8411; G01N 2030/8429; G01N 2030/027
 See application file for complete search history.

(56) References Cited

U.S. PATENT DOCUMENTS

| | | | |
|---|---|---|---|
| 8,968,561 B2* | 3/2015 | Kono | B01D 15/20 210/198.2 |
| 2004/0124128 A1 | 7/2004 | Iwata | |
| 2010/0276350 A1 | 11/2010 | Kono et al. | |
| 2015/0346166 A1 | 12/2015 | Morikawa et al. | |

OTHER PUBLICATIONS

International Search Report for PCT application PCT/JP2017/024089 dated Mar. 22, 2018.
Written Opinion of the ISR of Mar. 22, 2018 with partial translation (which is a machine translation).

* cited by examiner

LIQUID CHROMATOGRAPH

TECHNICAL FIELD

The present invention relates to a liquid chromatograph such as a high-performance liquid chromatograph, and more particularly to a liquid chromatograph having a function of trapping and concentrating separated sample components in a trap column.

BACKGROUND ART

In a second dimension high-performance liquid chromatography, an eluent containing one or more analysis target components is fractionated on a downstream side of a column in a first dimension analysis, and the analysis target components are adsorbed on a trap column, and then the analysis target components adsorbed by the trap column are released to be guided to another column to perform a second dimension analysis (see Patent Document 1).

In such a high-performance liquid chromatograph, for the purpose of preventing the precipitation of the separated high concentration analysis target components in the eluent in the flow path, it is configured such that a large amount of a mobile phase containing a constant concentration organic solvent is flowed into the flow path to dilute the eluent. Also, when introducing an eluent to a trap column to adsorb it, when the organic solvent concentration in the eluent is high, it may occur that the analysis target components are not adsorbed by the trap column. For this reason, in order to prevent such a situation, it is performed to lower the organic solvent concentration of the eluent by using a diluent.

PRIOR ART

Patent Document
Patent Document 1: Japanese Unexamined Patent Application Publication No. 2004-205358

SUMMARY OF THE INVENTION

Problems to be Solved by the Invention

Generally, when the peak separation is performed, the organic solvent concentration of the mobile phase is often made to cause a gradient. In that case, the organic solvent concentration and flow rate of the mobile phase gradually change, and the organic solvent concentration in the eluent changes depending on the position of the peak in the chromatogram. That is, the organic solvent concentration in the eluent varies depending on the peak retention time.

The organic solvent concentration and flow rate of the diluent applicable to dilute the eluent differ depending on the organic solvent concentration of the dilution target eluent. In other words, when making to cause a gradient of a composition of a mobile phase in a first dimension analysis, the appropriate diluent composition and flow rate differ depending on that the eluent corresponds to which the peak part of the time.

However, in a conventional two dimension high-performance liquid chromatography, it is common to use an organic solvent concentration prepared beforehand as a diluent. For this reason, it was necessary to preliminarily determine the concentration and flow rate of the diluent by performing a preliminary analysis.

Under the circumstances, the present invention aims to enable to make a composition and a flow rate of a diluent of an eluent including sample components separated by a first dimension analysis so as to correspond to the composition of the eluent.

Means for Solving the Problems

The liquid chromatograph according to the present invention includes a first dimension analysis unit including a mobile phase liquid delivery unit configured to deliver a liquid mixture of plural kinds of solvents as a mobile phase while changing its composition and an analytical column configured to separate a sample injected into a flow path through which the mobile phase flows into components;
a diluent determination unit configured to determine a composition and a flow rate of a diluent for diluting an eluent flowing out of the first dimension analysis unit based on a composition of the eluent;
a trap column configured to trap sample components in the eluent flowing out of the first dimension analysis unit; and
a diluent liquid delivery unit configured to deliver the diluent of a composition determined by the diluent determination unit at a flow rate determined by the diluent determination unit so as to deliver the eluent flowing out of the first dimension analysis unit to the trap column while diluting the eluent.

It is preferable that the diluent determination unit be configured to specify the composition of the eluent flowing out of the first dimension analysis unit based on information on a liquid delivery flow rate of each solvent acquired from the mobile phase liquid delivery unit. With this, the composition of the eluent flowing out of the first dimension analysis unit can be accurately specified, which makes it possible to more precisely determine the composition and flow rate of the eluent.

It may be configured such that the liquid chromatograph may further include: a diluent data holding unit configured to hold, as diluent data, a preset correspondence relationship between the composition of the eluent flowing out of the first dimension analysis unit and the composition and flow rate of the diluent corresponding to the composition of the eluent, wherein the diluent determination unit determines the composition and flow rate of the diluent corresponding to the composition of the eluent flowing out of the first dimension analysis unit based on the diluent data. With this, the composition and flow rate of the eluent can be easily determined.

Effects of the Invention

The liquid chromatograph according to the present invention is provided with a diluent determination unit configured to determine a composition and a flow rate of a diluent for diluting the eluent flowing out of the first dimension analysis unit based on the composition of the eluent flowing out from the first dimension analysis unit. Therefore, the composition and flow rate of the diluent can be determined without performing a preliminary analysis to determine the composition and flow rate of the diluent. The diluent liquid delivery unit is configured to deliver the diluent of the composition determined by the diluent determination unit at the flow rate determined by the diluent determination unit. Therefore, the composition and flow rate of the diluent can be made so as to correspond to the composition of the eluent flowing out of the first dimension analysis unit.

EMBODIMENTS FOR CARRYING OUT THE INVENTION

Hereinafter, an embodiment of a liquid chromatograph according to the present invention will be described with reference to the drawings.

Embodiment 1

An embodiment of a liquid chromatograph of a system in which an eluent flowing out of a first dimension analysis unit is temporarily held in a fraction loop and then the sample components in the eluent held in the fraction loop are trapped by a trap column will be described with reference to FIG. 1 to FIG. 7.

Figure 1:
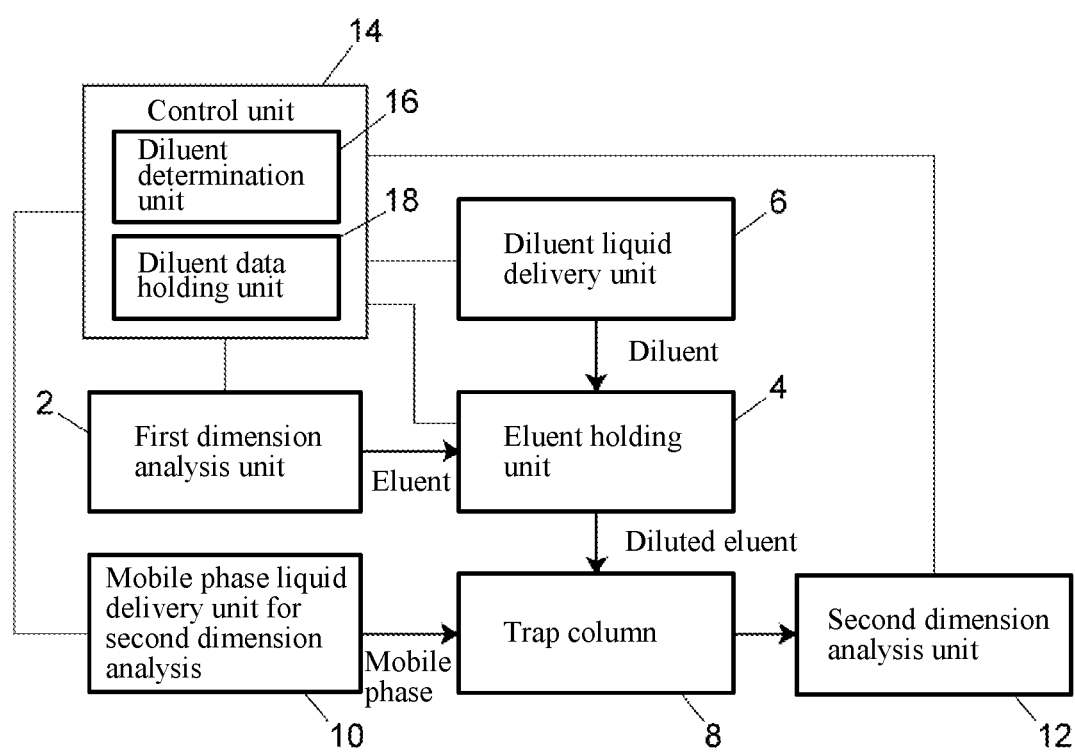
FIG. 1 is a block diagram schematically showing a configuration of an embodiment of a liquid chromatograph.

As shown in FIG. 1, the liquid chromatograph of this embodiment is provided with a first dimension analysis unit 2, an eluent holding unit 4, a diluent liquid delivery unit 6, a trap column 8, a mobile phase liquid delivery unit 10 for a second dimension analysis, a second dimension analysis unit 12, and a control unit 14.

Although not shown in the figure, the first dimension analysis unit 2 is provided with a mobile phase liquid delivery unit for delivering a mobile phase composed of a liquid mixture of plural types of solvents, a sample injection section for injecting a sample into a flow path to which the mobile phase from the mobile phase liquid delivery unit is supplied, an analytical column for separating the sample injected by the sample injection unit for each component, and a detector for detecting the sample components separated by the analytical column. The sample components separated by the analytical column is guided to the eluent holding unit 4 via the detector.

The eluent holding unit 4 is connected to the downstream side of the first dimension analysis unit 2 and holds the sample components separated by the analytical column of the first dimension analysis unit 2 together with the eluent. The eluent holding unit 4 holds only the eluent corresponding to a desired peak appeared in the detection signal of the detector out of the eluent flowed out of the first dimension analysis unit 2 in synchronization with the detection signal of the detector of the first dimension analysis unit 2. The operation of the eluent holding unit 4 is controlled by a control unit 14 to be described later.

The diluent liquid delivery unit 6 is configured, in the concentration step of trapping and concentrating the sample components held in the eluent holding unit 4 in the trap column 8, to deliver a diluent to dilute the eluent retained in the eluent holding unit 4 and lead it to the trap column 8. The diluent liquid delivery unit 6 is configured to deliver diluents of various compositions. The operation of the diluent liquid delivery unit 6 is controlled by the control unit 14 so that the composition and flow rate of the diluent supplied from the diluent liquid delivery unit 6 become a composition and a flow rate depending on the composition of the dilution target eluent held in the eluent holding unit 4.

The mobile phase liquid delivery unit 10 for a second dimension analysis is configured to deliver the mobile phase from the upstream side of the trap column 8 after the sample component of the analysis target is trapped by the trap column 8 to convey the sample components trapped by the trap column 8 to the second dimension analysis unit 12. The operation of the mobile phase liquid delivery unit 10 for a second dimension analysis is also controlled by the control unit 14.

Although not illustrated here, the second dimension analysis unit 12 is provided with an analytical column for further separating the sample components eluted from the trap column 8 and a detector for detecting the sample components separated by the analytical column.

The control unit 14 controls, as described above, the operations of the first dimension analysis unit 2, the eluent holding unit 4, the diluent liquid delivery unit 6, and the mobile phase liquid delivery unit 10 for a second dimension analysis. The control unit 14 receives a signal of the detector of the first dimension analysis unit 2 and controls the operation of the eluent holding unit 4 so that desired sample components are held in the eluent holding unit 4 based on the detection signal. The control unit 14 is realized by a computer dedicated to this liquid chromatograph or a general-purpose personal computer.

The control unit 14 is provided with a diluent determination unit 16 and a diluent data holding unit 18. The diluent determination unit 16 is a function obtained by an arithmetic element (CPU) executing a program stored in a storage device provided in a computer that realizes the control unit 14. The diluent data holding unit 18 is a function realized by one area of the storage device.

Figure 6:
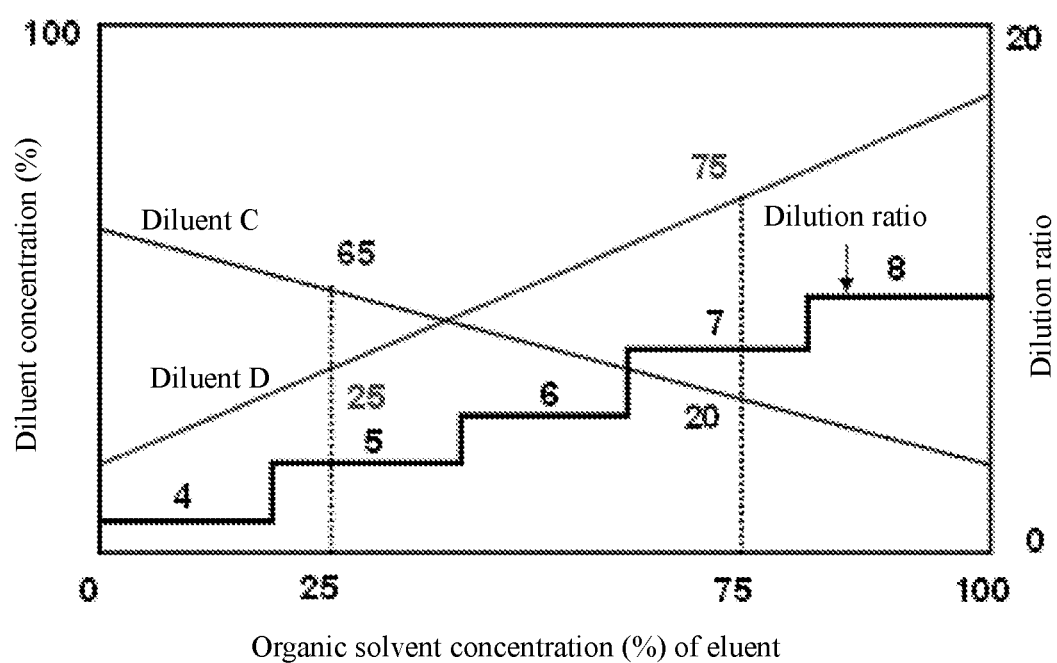
FIG. 6 is a graph showing an example of diluent data of the embodiment.

The diluent determination unit 16 is configured to specify the composition of the eluent when the dilution target eluent is held in the eluent holding unit 4 based on the liquid delivery information (e.g., gradient program) of the mobile phase liquid delivery unit of the first dimension analysis unit 2 and determine the composition and flow rate (dilution ratio) of the diluent based on the diluent data held in the diluent data holding unit 18. The diluent data held in the diluent data holding unit 18 denotes data showing the correspondence relation between the composition of the eluent including the sample components held in the eluent holding unit 4 and the composition and flow rate of the eluent suitable for the composition. As the diluent data, in addition to the graph as shown in FIG. 6, a table as shown in the following Table 1 can be exemplified.

The diluent liquid delivery unit 6 delivers the diluent of the composition determined by the diluent determination unit 16 at the flow rate (dilution ratio) determined by the diluent determination unit 16.

Figure 2:
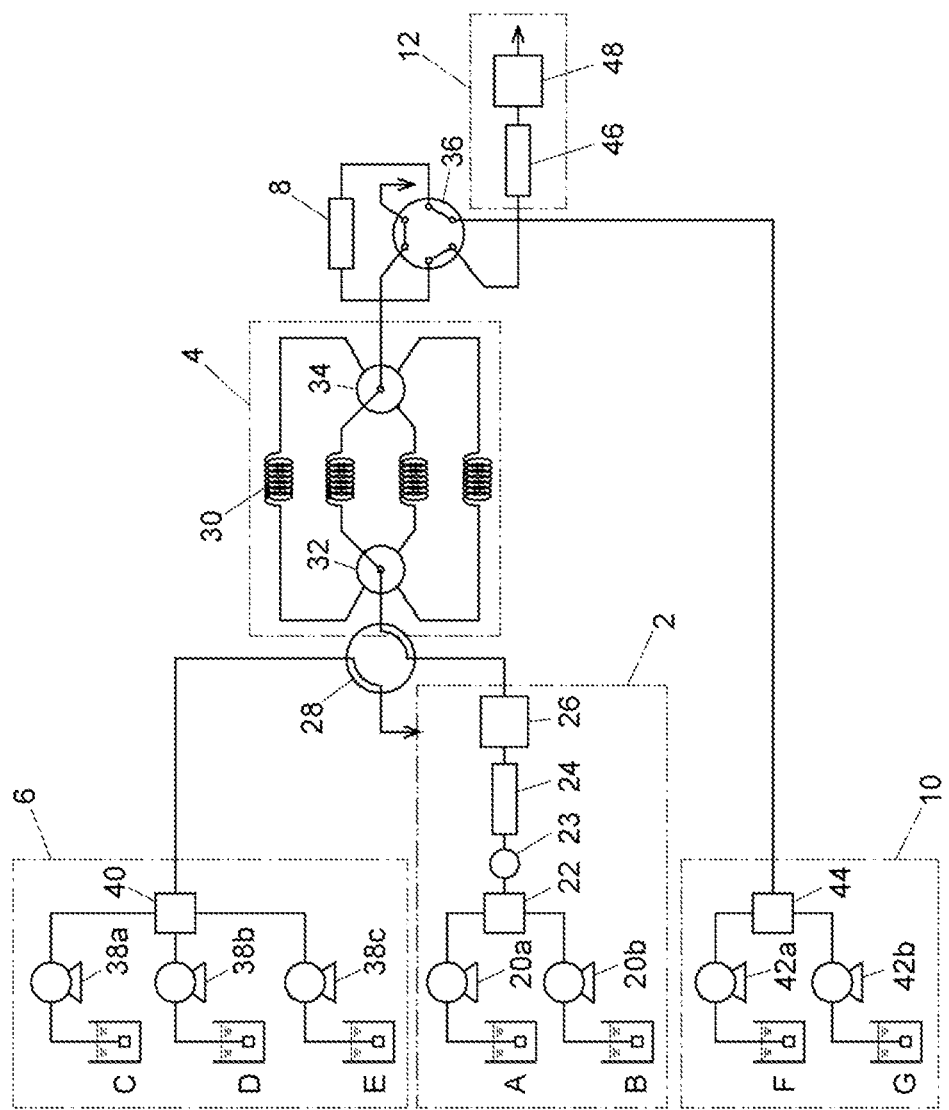
FIG. 2 is a flow path configuration diagram showing an example of a flow path configuration of the liquid chromatograph of the embodiment.

An example of a specific flow path configuration of the liquid chromatograph of this embodiment will be described with reference to FIG. 2 together with FIG. 1.

The first dimension analysis unit 2 is provided with a liquid delivery pump 20a for delivering a solvent A as a mobile phase liquid delivery unit, a liquid delivery pump 20b for delivering a solvent B, and a mixer 22 for mixing the solvents A and B delivered by the liquid delivery pumps 20a and 20b. A sample injection unit 23, an analytical column 24, and a detector 26 are provided from the upstream side on the flow path through which the mobile phase consisting of a liquid mixture of the solvents A and B flows. The downstream side flow path of the detector 26 is connected to one port of the switching valve 28. The switching valve 28 switches one of the first dimension analysis unit 2 and the diluent liquid delivery unit 6 to the eluent holding unit 4 to connect it.

The eluent holding unit 4 is provided with a plurality of fraction loops 30 and switching valves 32 and 34 for switching flow the path connection so as to select and use one of the fraction loops 30. The switching valves 32 and 34 are switched in synchronization with the detection signal of the detector 26 so that the eluent corresponding to a desired peak portion appearing in the detection signal of the detector 26 of the first dimension analysis unit 2 is held in the individual fraction loop 30.

The diluent liquid delivery unit 6 is provided with a liquid delivery pump 38a for delivering a diluent C, a liquid delivery pump 38b for delivering a diluent D, a liquid delivery pump 38c for delivering a diluent E, and a mixer 40 for mixing the diluents C, D and E to be delivered by the liquid delivery pumps 38a, 38b, and 38c. The diluents C, D, and E are different diluents. In this embodiment, it is configured to use three types of diluents, but it may be configured to use many types of diluents, or to use two types of diluents.

The diluent liquid delivery unit 6 can adjust the diluents to be mixed in the mixer 40 to a desired composition by controlling the operation speeds of the liquid delivery pumps 38a, 38b, and 38c. The operations of the liquid delivery pumps 38a, 38b, and 38c are controlled by the control unit 14 so that the composition of the diluents to be mixed in the mixer 40 becomes a composition determined by the diluent determination unit 16 according to the composition of the dilution target eluent.

One port (common port) of the switching valve 34 on the outlet side of the eluent holding unit 4 is connected to one port of the 6-port valve 36. To each port of the 6-port valve 36, both ends of the trap column 8, a drain, a mobile phase liquid delivery unit 10 for a second dimension analysis, and a second dimension analysis unit 12 are connected. With the 6-port valve 36, it is switched to either the state (state shown in FIG. 2) in which the switching valve 34 and the drain are connected and the mobile phase liquid delivery unit 10 for a second dimension analysis, the trap column 8, and the second dimension analysis unit 12 are connected, or the state (state shown in FIG. 4) in which the switching valve 34, the trap column 8, and the drain are connected and the mobile phase liquid delivery unit 10 for a second dimension analysis and the second dimension analysis unit 12 are connected.

The mobile phase liquid delivery unit 10 for the second dimension analysis is provided with a liquid delivery pump 42a for delivering a solvent F, a liquid delivery pump 42b for delivering a solvent G, and a mixer 44 for mixing solvents F and G delivered by these liquid delivery pumps 42a and 42b.

The second dimension analysis unit 12 is provided with an analytical column 46 for further separating the sample components eluted from the trap column 8 and a detector 48 for detecting the sample components separated by the analytical column 46.

The operation of the liquid chromatograph of this embodiment will be described with reference to FIG. 3 to FIG. 5 together with FIG. 1.

Figure 3:
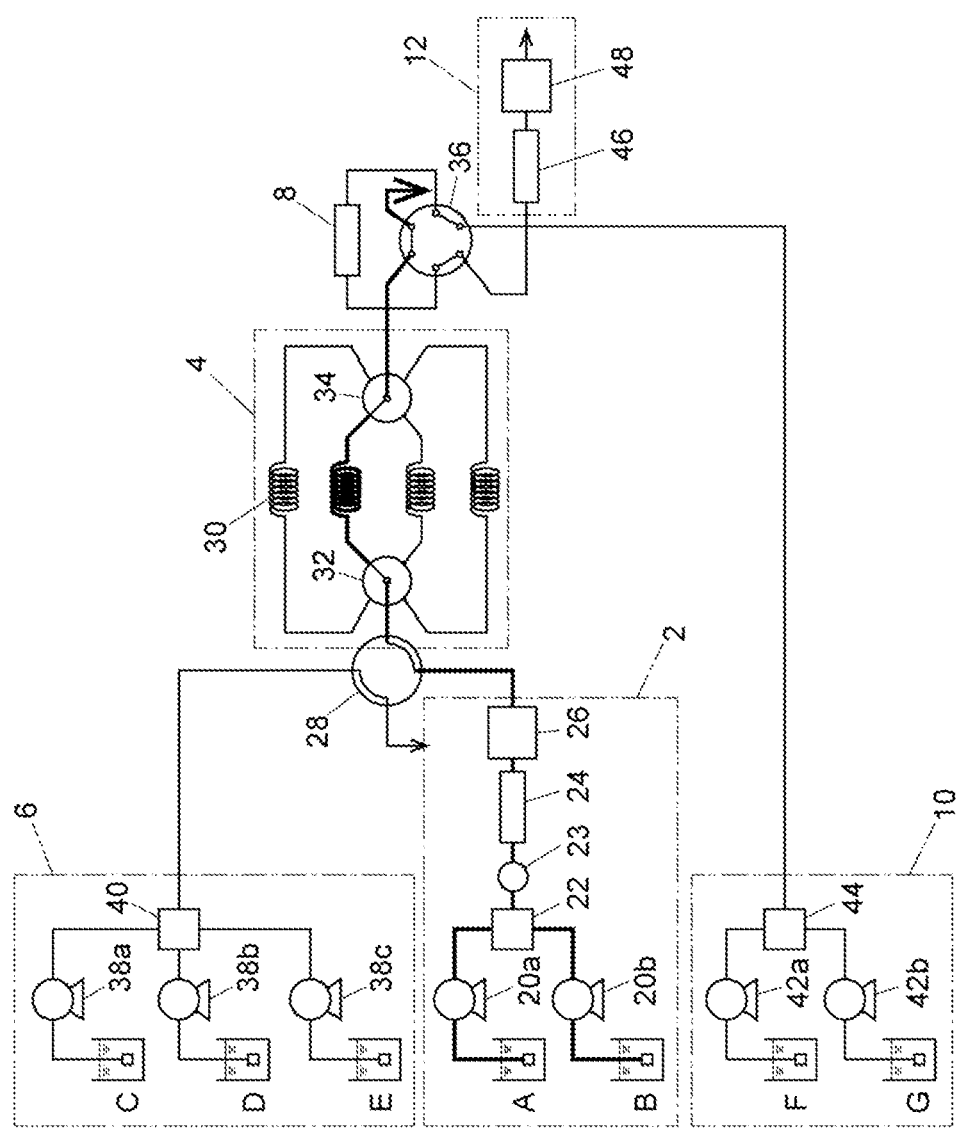
FIG. 3 is a diagram showing an example of a flow path configuration at the time of a first dimension analysis step in the embodiment.

As indicated by the bold line in FIG. 3, the liquid delivery pumps 20a and 20b deliver the solvents A and B to the mixer 22, the sample injected by the sample injection unit 23 is guided by the mobile phase flowing out of the mixer 22 to the analytical column 24 to be separated for each component. Each sample component separated by the analytical column 24 sequentially elutes from the analytical column 24 together with the eluent and is guided to the detector 26. Each sample component eluted from the analytical column 24 is detected as a peak in the detection signal of the detector 26 and an eluent portion corresponding to the peak is held in a desired fraction loop of the eluent holding unit 4. This is a first dimension analysis step.

Figure 4:
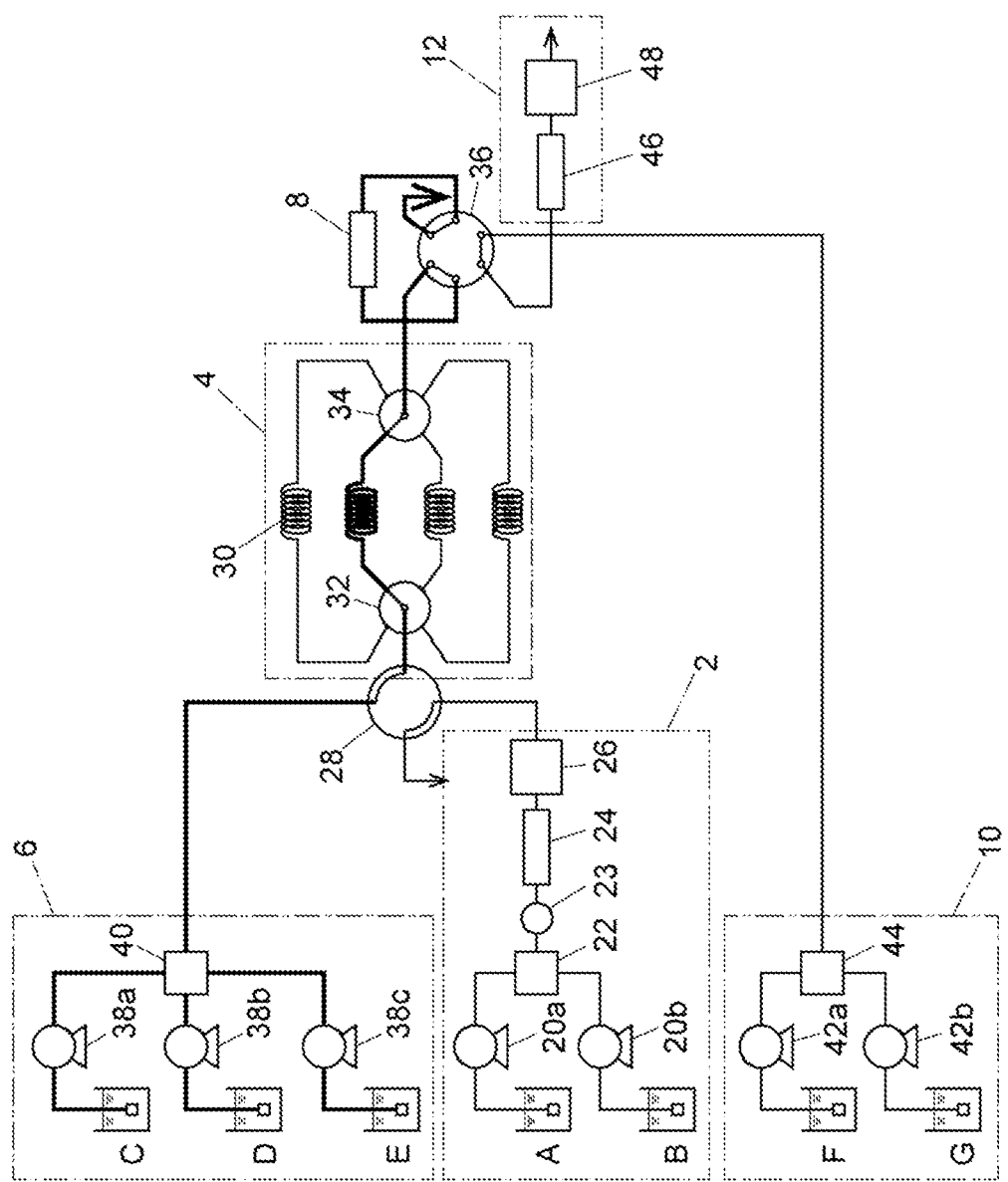
FIG. 4 is a diagram showing an example of a flow path configuration at the time of a concentration step in the embodiment.
Figure 5:
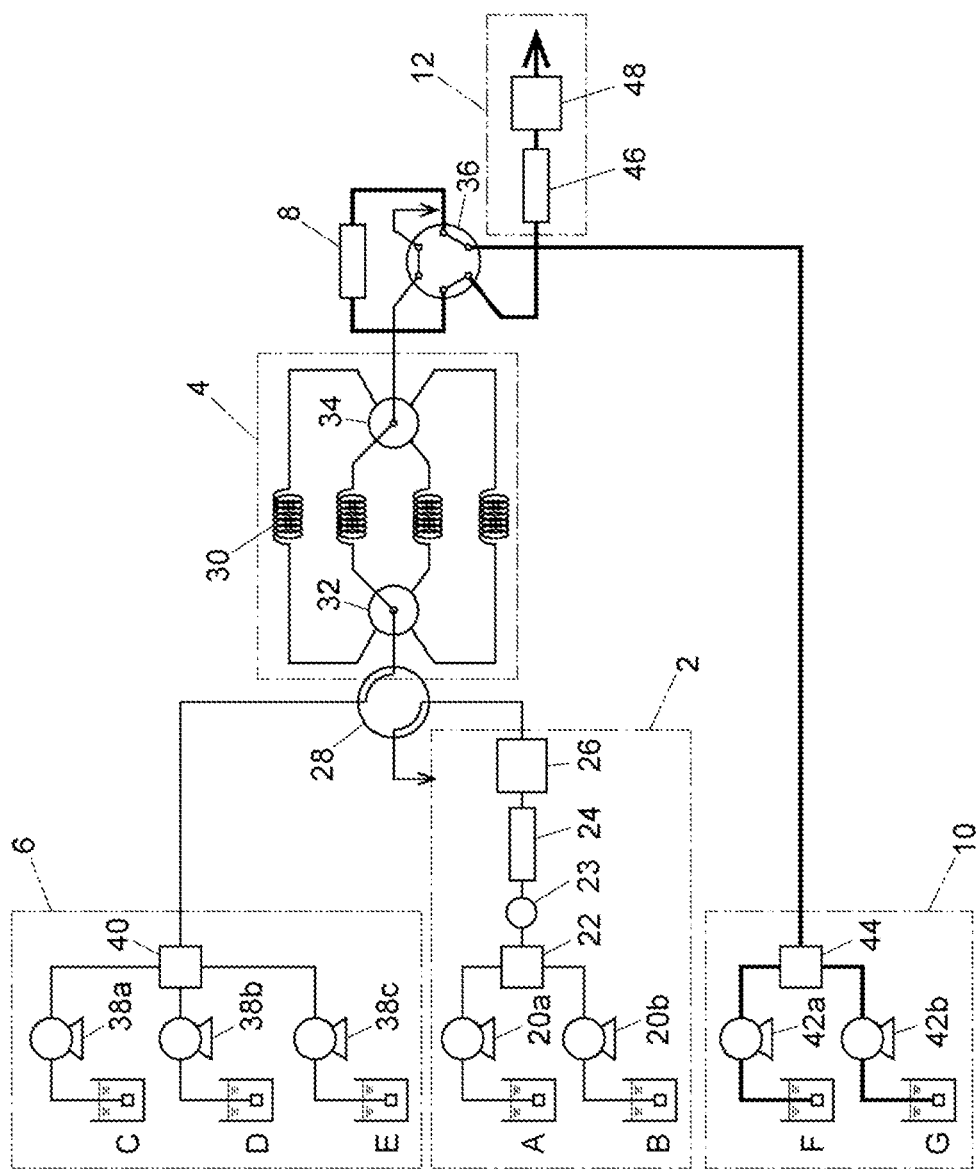
FIG. 5 is a diagram showing an example of a flow path configuration at the time of a second dimension analysis step in the embodiment.

After completion of the above-described first dimension analysis, as indicated by the bold line in FIG. 4, the flow path configuration is switched so that the diluent liquid delivery unit 6, the eluent holding unit 4, and the top column 8 are connected in series, so that the diluent is delivered from the diluent liquid delivery unit 6 to the fraction loop 30. The diluent is delivered from the diluent liquid delivery unit 6, whereby the eluent held in the fraction loop 30 is delivered to the trap column 8 while being diluted, and only the sample components are trapped by the trap column 8. This is a concentration step.

The composition and flow rate of the diluent delivered from the diluent liquid delivery unit 6 in this concentration step is determined by the composition (organic solvent concentration) of the diluent target eluent held in the fraction loop 30. The composition (organic solvent concentration) of the eluent held in the fraction loop 30 can be specified from the gradient program of the mobile phase in the first dimension analysis step performed by the first dimension analysis unit 2 and the retention time of the peak of the detection signal of the detector 26 corresponding to that eluent. In the diluent data holding unit 18 (see FIG. 1) of the control unit 14 (see FIG. 1), for example, diluent data as shown in FIG. 6 is prepared so that when the composition of the eluent is once specified, the diluent composition and dilution ratio optimal for diluting the eluent are automatically determined.

The diluent data of FIG. 6 will be described. In this graph, the horizontal axis denotes the organic solvent concentration (%) of the eluent and the vertical axis denotes the concentration and dilution ratio of each diluent. When the organic solvent concentration in the eluent is specified, the concentration and dilution ratio of each of the diluent C, the diluent D, and the diluent E is determined. For example, when the organic solvent concentration of the dilution target eluent is 25%, the concentration of the diluent C is 65%, the concentration of the diluent D is 25%, the concentration of the diluent E is 10%, and the dilution ratio is 5 times. Also, when the organic solvent concentration of the dilution target eluent is 75%, the concentration of the diluent C is 20%, the concentration of the diluent D is 75%, the concentration of the diluent E is 5%, and the dilution ratio is 7 times.

The operations of the liquid delivery pumps 38a, 38b, and 38c of the diluent liquid delivery unit 6 is controlled by the control unit 14 (see FIG. 1) so that the composition and dilution ratio of the eluent becomes those determined. With this, a diluent having appropriate composition is delivered at an appropriate flow rate depending on the composition of the eluent held in each fraction loop 30 of the eluent holding unit 4, which prevents the sample components from precipitating and passing through without being trapped by the trap column 8.

After completion of the above-described concentration step, the flow path configuration is switched so that the mobile phase liquid delivery unit 10, the trap column 8, and the second dimension analysis unit 12 for a second dimension analysis are connected in series, so that the mobile phase is delivered from the mobile phase liquid delivery unit 10 for a second dimension analysis. By the mobile phase from the mobile phase liquid delivery unit 10 for a second dimension analysis, the sample components trapped by the trap column 8 are eluted and led to the analytical column 46 for further separation. The sample components separated by the analytical column 46 are guided by the detector 48 and detected. This is the second dimension analysis step.

Figure 7:
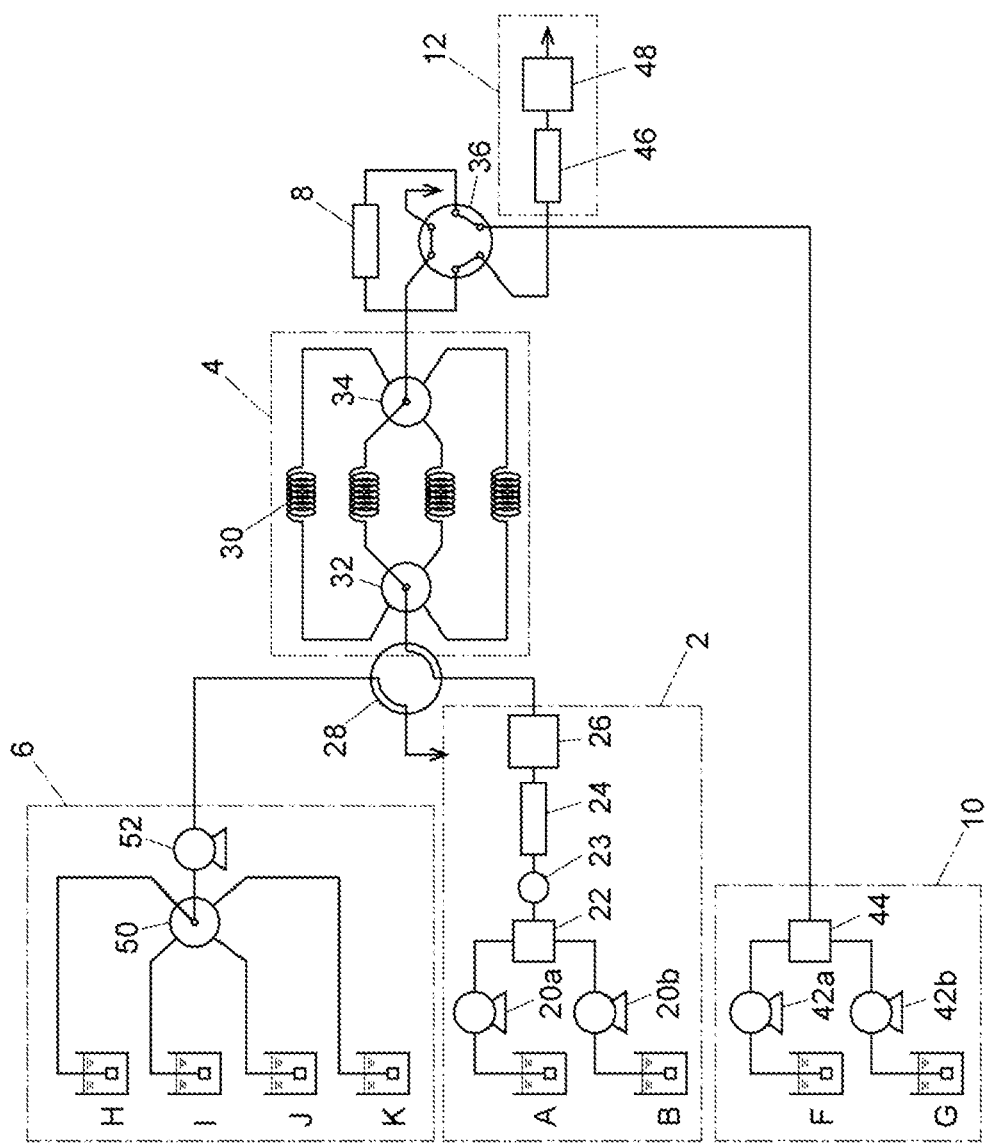
FIG. 7 is a flow path configuration diagram showing another embodiment of a flow path configuration of a liquid chromatograph.

In the above-described embodiment described with reference to FIG. 2 to FIG. 5, it is configured such that the diluent liquid delivery unit 6 mixes the diluents C, D, and E of plural types with the mixer 40 so that a diluent having a desired composition can be delivered. However, the diluent liquid delivery unit 6 may be constructed so that diluents different in organic solvent concentration are preliminary prepared (premixed) and from among the diluents, a diluent adapted to a composition of a dilution target eluent is selectively delivered. FIG. 7 is a flow path configuration diagram showing one embodiment in which the diluent liquid delivery unit 6 is configured as described above.

In the embodiment of FIG. 7, the diluent liquid delivery unit 6 is configured to select any one of diluents H, I, J, and K mutually different in organic solvent concentration by the switching valve 50 and deliver it by the liquid delivery pump 52. For the purpose of deciding which diluent H, I, J, or K should be used, as diluent data, for example, a table as shown in Table 1 is prepared in the diluent data holding unit 18 (see FIG. 1).

TABLE 1

| Diluent | H | I | J | K |
|---|---|---|---|---|
| Concentration of solvent B | 0 ≤ k < 25 | 25 ≤ k < 50 | 50 ≤ k < 75 | 75 ≤ k < 100 |
| Dilution ratio | 4 | 5 | 6 | 7 |

By using the table of Table 1, when the concentration of the organic solvent (solvent B) of the eluent held in each fraction loop 30 is specified, the diluent to be used and its flow rate (dilution ratio) are automatically determined.

As described above, in the liquid chromatograph of this embodiment, the control unit 14 for controlling the operation of the diluent liquid delivery unit 6 is equipped with a diluent determination unit 16. Therefore, the composition and flow rate of the diluent suitable for the composition of the eluent held in the eluent holding unit 4 are automatically determined, so that the diluent having an appropriate composition is delivered from the diluent liquid delivery unit 6 at the appropriate flow rate during the concentration step. Therefore, it is unnecessary for the user to perform a preliminary analysis to determine the composition and flow rate of the diluent.

Embodiment 2

Next, an embodiment of a liquid chromatograph of a system in which an eluent containing sample components flowing out of a first dimension analysis unit 2 is directly guided to a trap column will be described with reference to FIG. 8 to FIG. 12. Note that in this embodiment, portions having the same functions as those of the above-described embodiment described with reference to FIG. 1 to FIG. 7 are denoted by the same reference numerals, and a detailed description thereof will be omitted.

Figure 8:
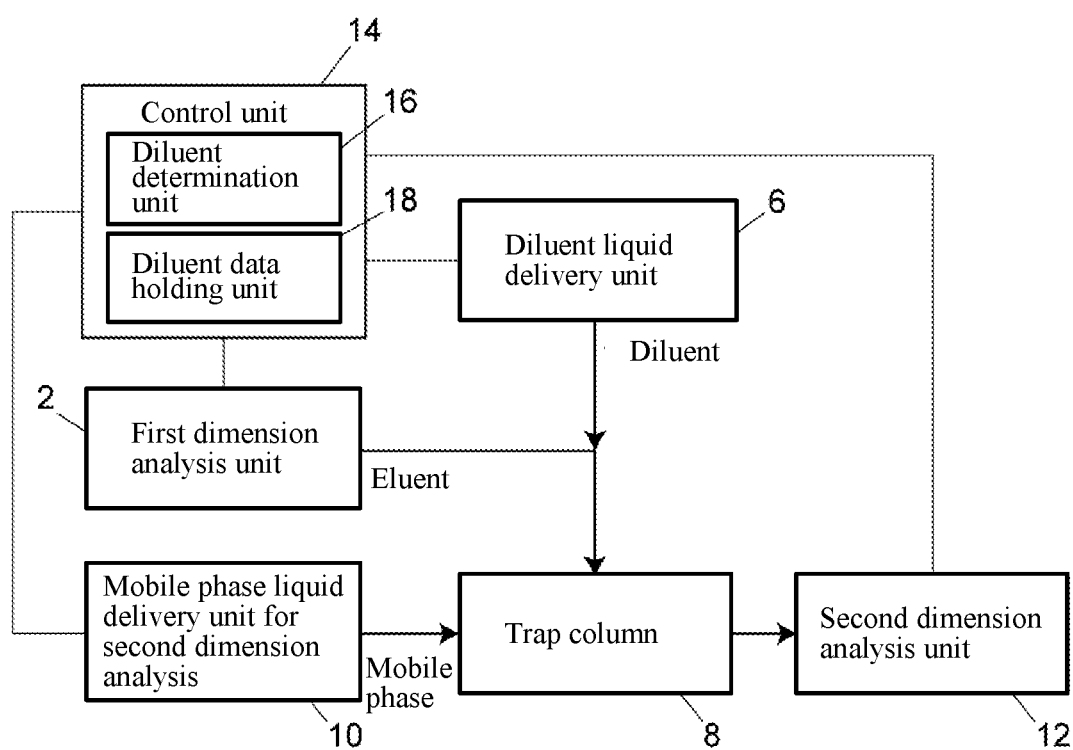
FIG. 8 is a block diagram schematically showing a configuration of another embodiment of a liquid chromatograph.
Figure 9:
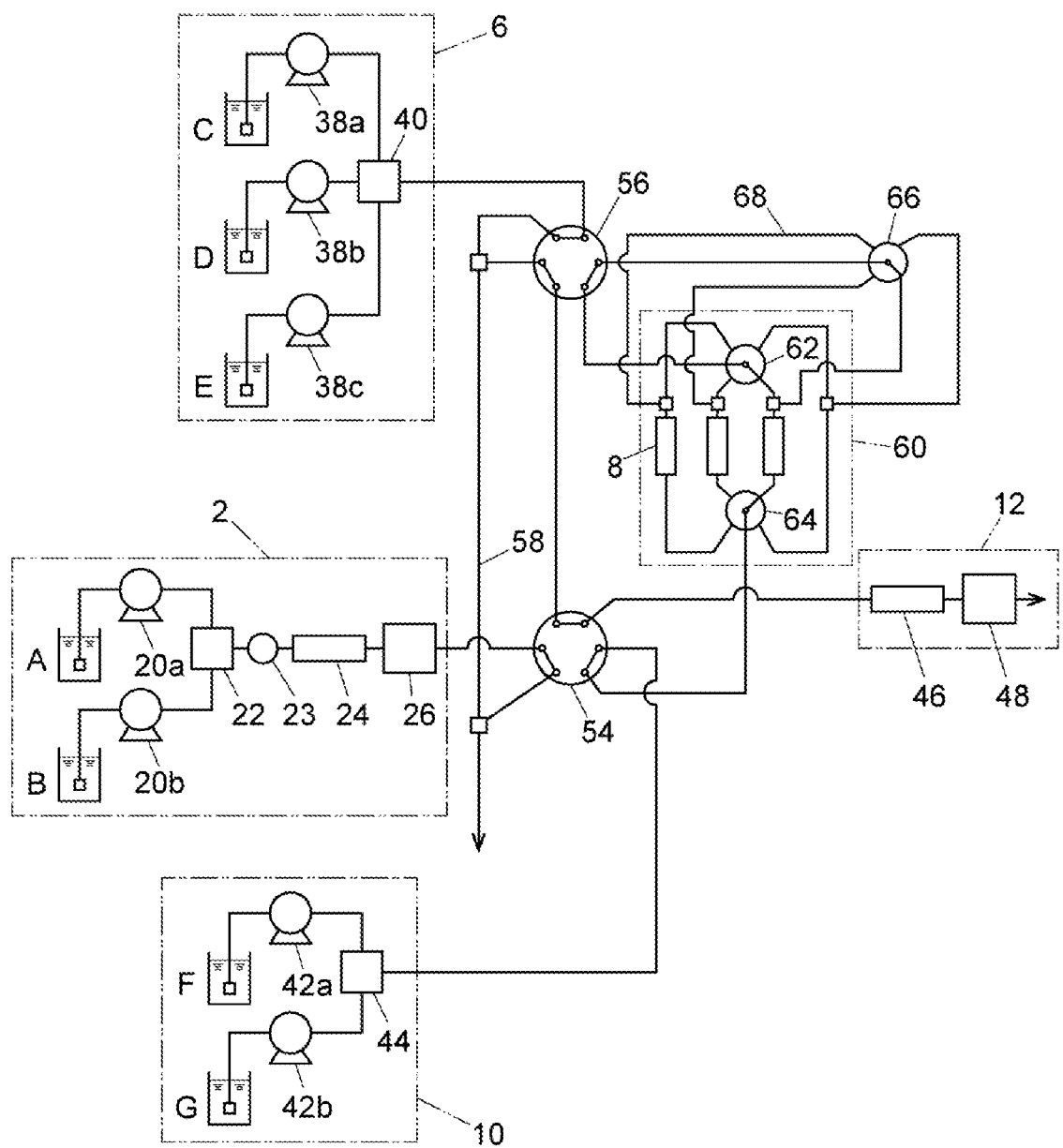
FIG. 9 is a flow path configuration diagram showing an example of a flow path configuration of the liquid chromatograph of the embodiment.

As shown in FIG. 8, in the liquid chromatograph of this embodiment, the eluent flowing out of the first dimension analysis unit 2 is configured to be directly guided to the trap column 8. The diluent liquid delivery unit 6 is configured to dilute the eluent which is being delivered from the first dimension analysis unit 2 to the trap column 8 by the diluent. Although not shown in FIG. 8, a flow path switching valve is provided between the first dimension analysis unit 2 and the trap column 8 so that only the eluent containing the sample components separated by the analytical column of the first dimension analysis unit is delivered to the trap column 8.

The composition of the diluent delivered from the diluent liquid delivery unit 6 is determined by the diluent determination unit 16 of the control unit 14 in the same manner as in the first embodiment. The diluent determination unit 16 finds the composition of the eluent to be led to the trap column 8 based on the liquid delivery information from the first dimension analysis mobile phase liquid delivery unit provided in the first dimension analysis unit 2, and determines the composition of the diluent for diluting the eluent based on the diluent data held in the diluent data holding unit 18.

FIG. 9 to FIG. 12 show an example of a specific flow path configuration of the liquid chromatograph of this embodiment.

In this embodiment, the trap column unit 60 having a plurality of trap columns 8 is provided. By switching the flow path switching valves 54 and 56, it is possible to attain any one of states including: the state in which the drain flow path 58 is connected to the downstream side of the first dimension analysis unit 2 (the state of FIG. 10); the state in which the trap column unit 60 is connected to the downstream side of the first dimension analysis unit 2 and at the same time the diluent liquid delivery unit 6 is connected to the upstream side of any one of the trap columns 8 of the trap column unit 60 (the state of FIG. 11), or the state in which the trap column 8 is connected to the downstream side of the mobile phase liquid delivery unit 10 for a second dimension analysis and the second dimension analysis unit 12 is connected to the downstream of the mobile phase liquid delivery unit 10 for a second dimension analysis (the state of FIG. 12).

The trap column unit 60 is provided with a flow path switching valves 62 and 64. By these flow path switching valves 62 and 64, it is configured such that the trap column 8 connected to the downstream side of the first dimension analysis unit 2 or the downstream side of the mobile phase liquid delivery unit 10 for a second dimension analysis can be selectively switched.

The flow path on the downstream side of the detector 26 of the first dimension analysis unit 2 is connected to one of ports of the flow path switching valve 54. The flow path switching valve 54 is a 6-port valve having 6 ports. Connected to the remaining ports of the 6-port valve 54 are a flow path leading to one of ports of the flow path switching valve 56, a drain flow path 58, a flow path leading to the common port of the flow path switching valve 64, a flow path from the mobile phase liquid delivery unit 10 for a second dimension analysis, and a flow path leading to the second dimension analysis unit 12.

The flow path switching valve 56 is a 6-port valve similar to the flow path switching valve 54. A drain flow path 58 is connected to two adjacent ports of the flow path switching valve 56. Connected to the remaining ports are a flow path leading to the flow path switching valve 54, the flow path from the diluent liquid delivery unit, the flow path leading to the common port of the flow path switching valve 66, and a flow path leading to the common port of the flow path switching valve 62.

Each selection port of the flow path switching valve 66 is connected to a flow path leading to each trap column 8 of the trap column unit 60, and is configured to selectively switch the diluent from the diluent liquid delivery unit 6 to which flow path leading to which the trap column 8.

The flow path switching valves 54, 56, 62, 64, and 66 are controlled by the control unit 14 (see FIG. 8) so as to be switched in synchronization with the respective detection signals of the detector 26.

With the above configuration, the liquid chromatograph of this embodiment performs the following operation.

Figure 10:
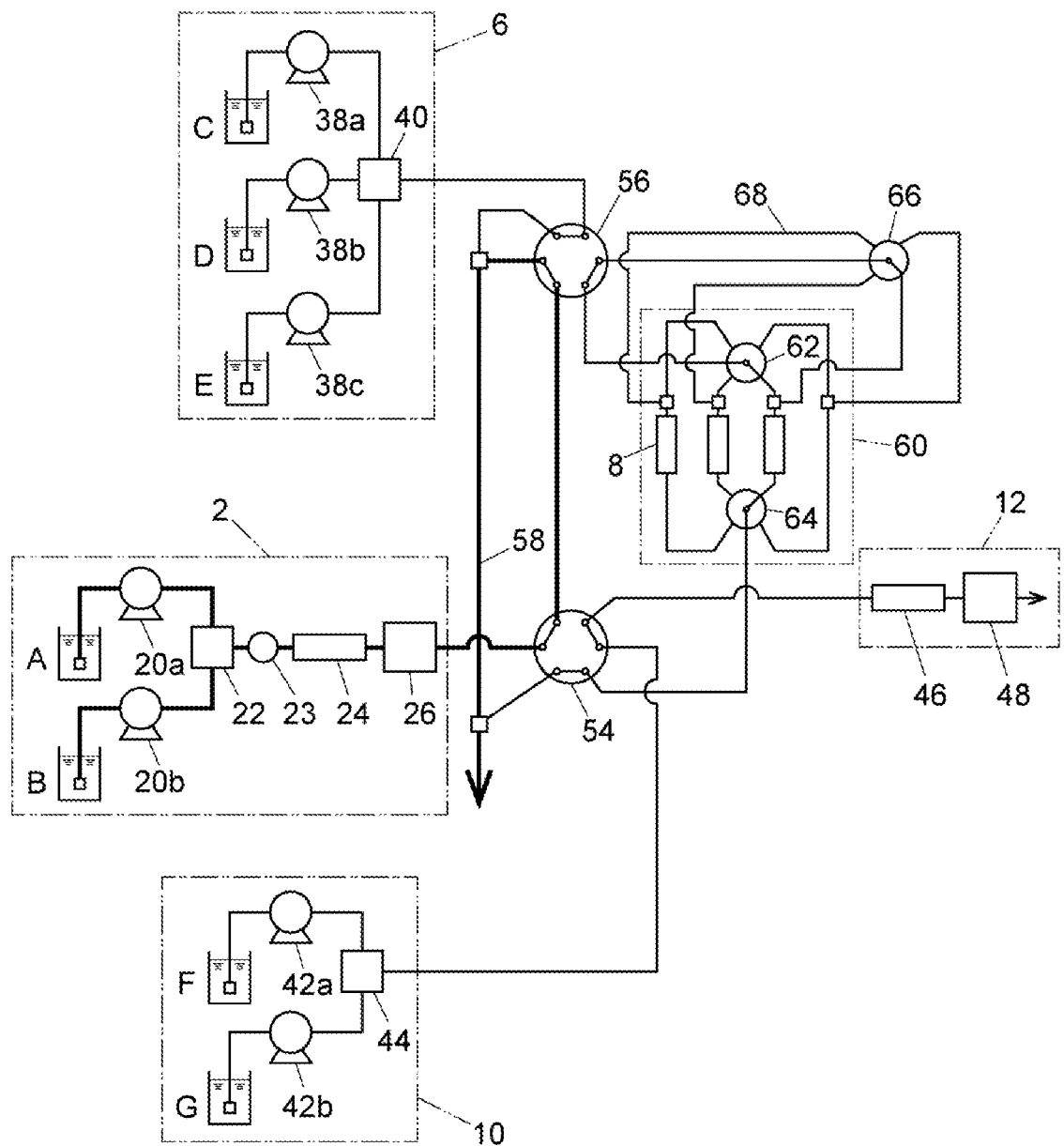
FIG. 10 is a diagram showing an example of a flow path configuration at the time of a first dimension analysis in the embodiment.
Figure 11:
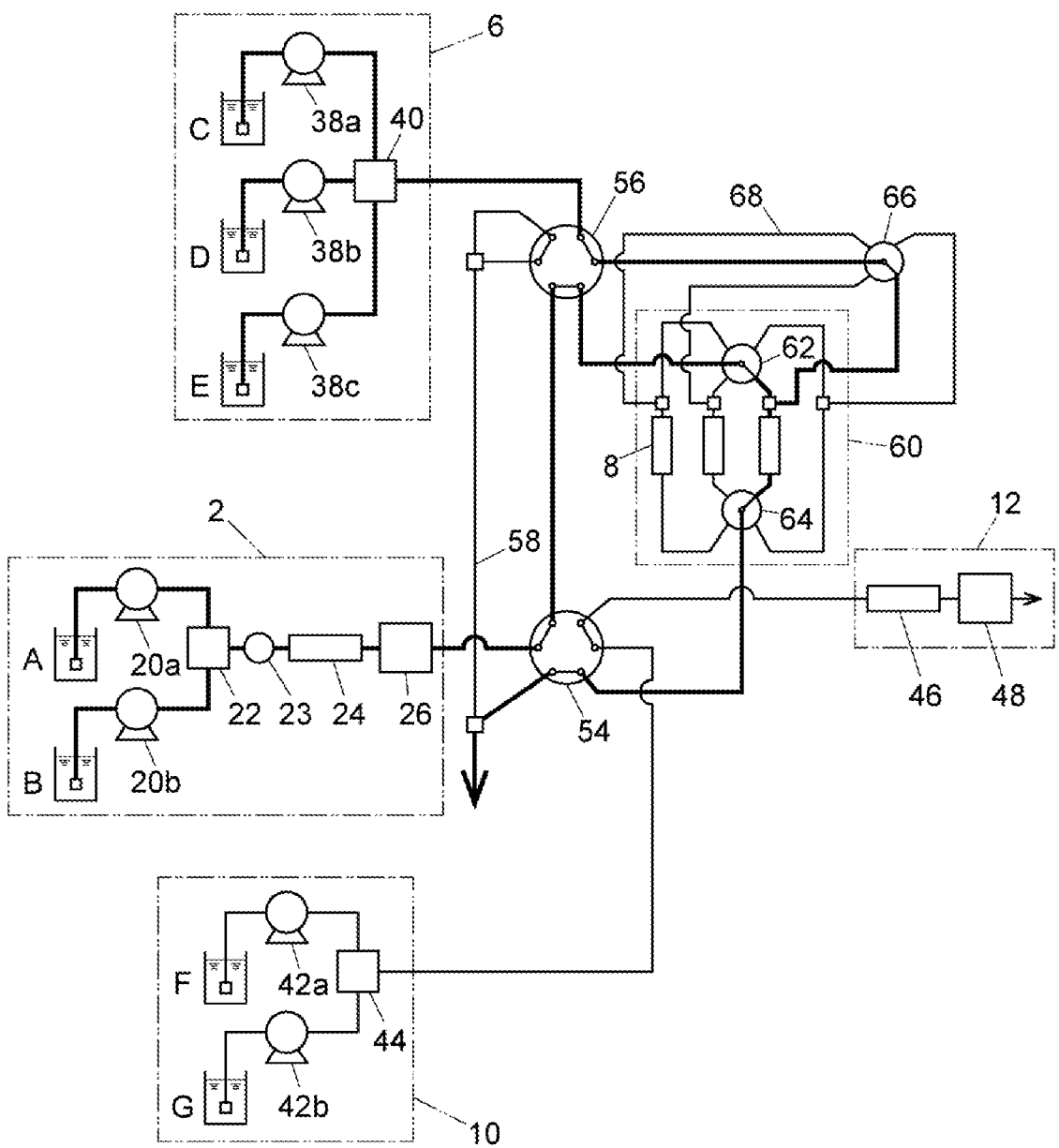
FIG. 11 is a diagram showing an example of a flow path configuration at a concentration step in the embodiment.

First, in the first dimension analysis step, until the sample components is detected by the detector 26, the flow path configuration is changed to the state shown in FIG. 10 so that the eluent flowing out of the first dimension analysis unit 2 is discharged via the drain flow path 58. When the sample components are detected by the detector 26, the flow path configuration is switched to the state of FIG. 11 so that the eluent including the sample components are led to the desired trap column 8, and the sample components are trapped by the desired trap column 8. That is, in this embodiment, the first dimension analysis step and the concentration step are performed simultaneously.

When the eluent flowing out of the first dimension analysis unit 2 is led to the trap column 8, the composition of the eluent to be led to the trap column 8 is found based on the liquid delivery information of the mobile phase liquid delivery unit for a first dimension analysis (liquid delivery pumps 20a and 20b), and based on the composition, the composition and flow rate of the diluent for diluting the eluent is determined by the diluent determination unit 16 (see FIG. 8). The determination method of the composition and flow rate of the diluent may be the same method as in the first embodiment. The diluent liquid delivery unit 6 delivers the diluent with the composition and flow rate determined by the diluent determination unit 16 so that the eluent to be introduced to the trap column 8 is diluted.

Figure 12:
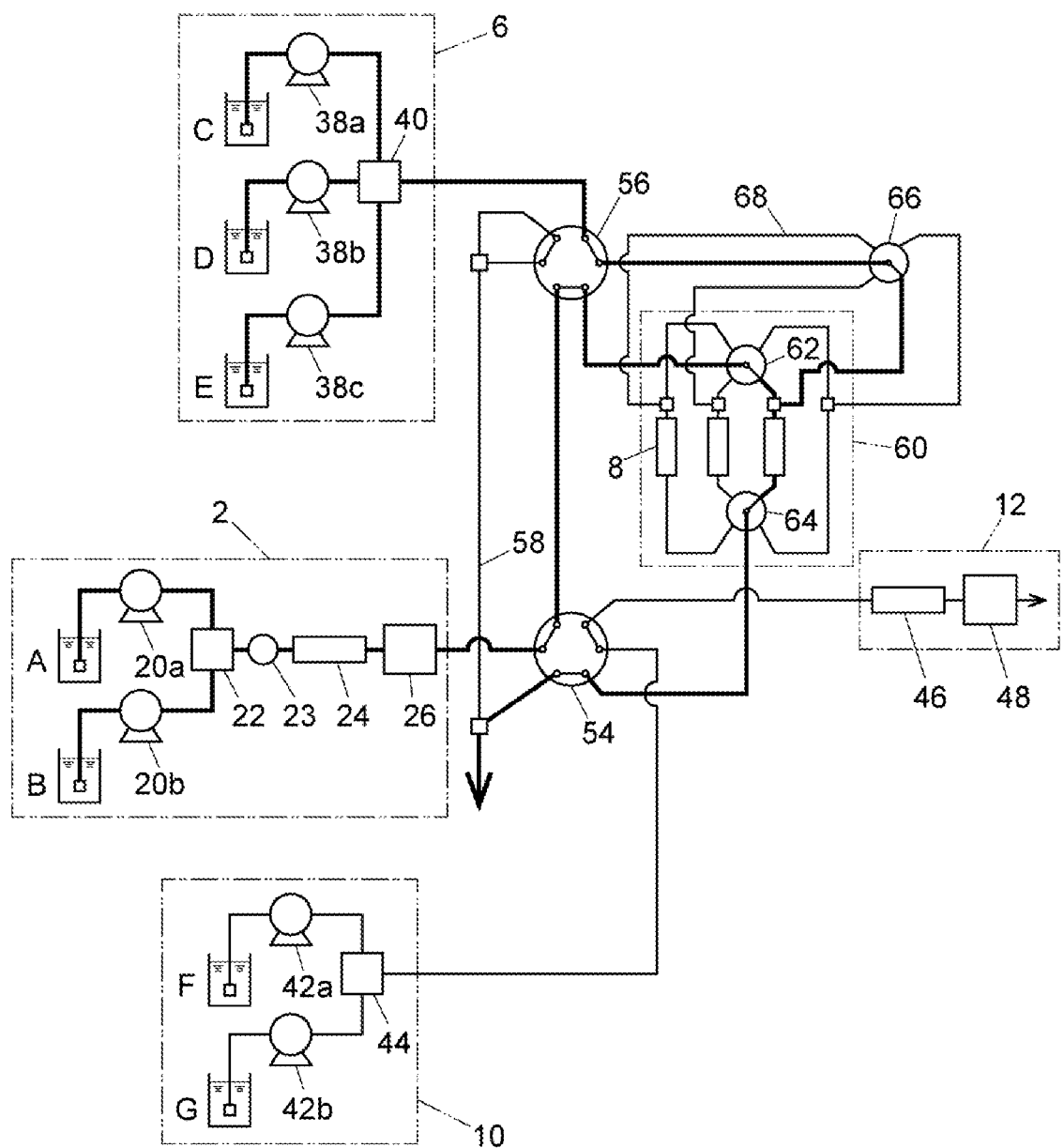
FIG. 12 is a diagram showing an example of a flow path configuration at the time of a second dimension analysis step in the embodiment.

After completion of the above-described first dimension analysis step and concentration step, the flow path configuration is switched to the state shown in FIG. 12 to guide the sample components trapped by the trap column 8 to the second dimension analysis unit 12 by the mobile phase from the mobile phase liquid delivery unit 10 for a second dimension analysis.

Also in this embodiment, since the control unit 14 for controlling the operation of the diluent liquid delivery unit 6 is provided with the diluent determination unit 16, the composition and flow rate of the dilution suitable for the eluent composition to be guided to the trap column 8 are automatically determined, and the diluent of the composition and flow rate suitable for diluting the eluent is delivered from the diluent liquid delivery unit 6. Therefore, it is unnecessary for the user to perform a preliminary analysis to determine the composition and flow rate of the diluent.

DESCRIPTION OF REFERENCE SYMBOLS 2 first dimension analysis unit
4 eluent holding unit
6 diluent liquid delivery unit
8 trap column
10 mobile phase liquid delivery unit for a second dimension analysis
12 second dimension analysis unit
14 control unit
16 diluent determination unit
18 diluent data holding unit
20a, 20b, 38a, 38b, 42a, 42b, 52 liquid delivery pump
22, 40, 44 mixer
23 sample injection unit
24, 46 analytical column
26, 48 detector
28, 32, 34, 36, 50 flow path switching valve
30 fraction loop

The invention claimed is:

1. A liquid chromatograph comprising:
a first dimension analysis unit including a mobile phase liquid delivery unit configured to deliver a liquid mixture of plural kinds of solvents as a mobile phase while changing its composition and an analytical column configured to separate a sample injected into a flow path through which the mobile phase flows into components;
a controller comprising a diluent determination unit configured to determine a composition and a flow rate of a diluent for diluting an eluent flowing out of the first dimension analysis unit based on a composition of the eluent;
a trap column configured to trap sample components in the eluent flowing out of the first dimension analysis unit; and
a diluent liquid delivery unit configured to deliver the diluent of a composition determined by the diluent determination unit at a flow rate determined by the diluent determination unit so as to deliver the eluent flowing out of the first dimension analysis unit to the trap column while diluting the eluent;
wherein the first dimension analysis unit includes a detector for detecting separated components; and
wherein the diluent determination unit is configured to specify a component of the eluent based on a gradient program of the mobile phase liquid delivery unit of the first dimension analysis unit and a retention time of a peak of a detection signal of the detector and determine the composition and flow rate of the diluent according to the composition of the eluent.

2. The liquid chromatograph as recited in claim 1, wherein the diluent determination unit is configured to specify the composition of the eluent flowing out of the first dimension analysis unit based on information on a liquid delivery flow rate of each solvent acquired from the mobile phase liquid delivery unit.

3. The liquid chromatograph as recited in claim 1, wherein:

the controller further comprises a diluent data holding unit configured to hold, as diluent data, a preset correspondence relationship between the composition of the eluent flowing out of the first dimension analysis unit and the composition and flow rate of the diluent corresponding to the composition of the eluent, wherein the diluent determination unit determines the composition and flow rate of the diluent corresponding to the composition of the eluent flowing out of the first dimension analysis unit based on the diluent data.

4. The liquid chromatograph as recited in claim 3, wherein in the diluent data holding unit diluent data is prepared so that when the composition of the eluent is specified, the diluent composition and dilution ratio optimal for diluting the eluent are automatically determined.

5. The liquid chromatograph as recited in 4, wherein the diluent having an appropriate composition and flow rate is automatically delivered from the diluent liquid delivery unit making it unnecessary for a user to perform an analysis to determine the composition and flow rate of the diluent.

6. The liquid chromatograph as recited in claim 1, further comprising an eluent holding unit that holds eluent flowed out of the first dimension analysis unit and prior to reaching the trap column, which eluent corresponds to a desired peak appearing in a detection signal of the detector of the first dimension analysis unit.

7. The liquid chromatograph as recited in claim 6, wherein the controller controls operations of the first dimension analysis unit, the eluent holding unit and the diluent liquid delivery unit.

8. The liquid chromatograph as recited in claim 7, wherein the controller is configured to receive a signal from the detector of the first dimension analysis unit and controls the operation of the eluent holding unit so that desired sample components are held in the eluent holding unit based on the detection signal from the detector.

9. The liquid chromatograph as recited in claim 6, wherein the diluent determination unit is configured to specify the composition of the eluent when the eluent is held in the eluent holding unit based on data about the liquid mixture of solvents of the mobile phase.

10. The liquid chromatograph as recited in claim 9, wherein the diluent determination unit is configured to determine the composition and flow rate of the diluent based on the diluent data held in the diluent data holding unit.

11. The liquid chromatograph as recited in claim 10, wherein the diluent data held in the diluent data holding unit denotes data showing the correspondence relation between the composition of the eluent including the sample components held in the eluent holding unit and the composition and flow rate of the diluent to be provided suitable for the composition.

12. The liquid chromatograph as recited in claim 10, wherein the diluent data holding unit comprises a look-up table.

13. The liquid chromatograph as recited in claim 6, wherein the eluent holding unit comprises a plurality of fraction loops for holding a plurality of eluents corresponding to a plurality of detected peaks in a detection signal by the detector.

14. The liquid chromatograph as recited in claim 1, wherein the controller is a computer.

15. The liquid chromatograph as recited in claim 14, wherein the diluent determination unit is a function obtained by a CPU executing a program stored in a storage device within the computer, and the diluent data holding unit is a function realized by one area of the storage device.

16. The liquid chromatograph as recited in claim 1, wherein the diluent liquid delivery unit comprises liquid delivery pumps controlled by the controller so that a desired composition of diluents is mixed, which desired composition is determined by the diluent determination unit according to the composition of the eluent from the first dimension analysis unit.

17. The liquid chromatograph as recited in claim 1, further comprising a second dimension analysis unit positioned downstream from the trap column.

18. A liquid chromatography method comprising:
in a first dimension analysis unit including a mobile phase liquid delivery unit, delivering a liquid mixture of plural kinds of solvents as a mobile phase while changing its composition and an analytical column configured to separate a sample injected into a flow path through which the mobile phase flows into components;
within a controller comprising a diluent determination unit, determining a composition and a flow rate of a diluent for diluting an eluent flowing out of the first dimension analysis unit based on a composition of the eluent;
trapping sample components in a trap column from the eluent flowing out of the first dimension analysis unit; and
in a diluent liquid delivery unit, delivering the diluent of a determined by the diluent determination unit at a flow rate determined by the diluent determination unit so as to deliver the eluent flowing out of the first dimension analysis unit to the trap column while diluting the eluent;
detecting separated components with a detector that is part of the first dimension analysis unit; and
in the diluent determination unit specifying a component of the eluent based on a gradient program of the mobile phase liquid delivery unit of the first dimension analysis unit and a retention time of a peak of a detection signal of the detector and determining the composition and flow rate of the diluent according to the composition of the eluent.

* * * * *